US010250477B2

(12) United States Patent
Luo et al.

(10) Patent No.: US 10,250,477 B2
(45) Date of Patent: Apr. 2, 2019

(54) METHOD AND CONTROLLER FOR ANNOUNCING BANDWIDTH OF CLUSTER SYSTEM

(71) Applicant: Huawei Technologies Co., Ltd., Shenzhen (CN)

(72) Inventors: Wei Luo, Shenzhen (CN); Hongkun Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 223 days.

(21) Appl. No.: 15/235,420

(22) Filed: Aug. 12, 2016

(65) Prior Publication Data

US 2016/0352607 A1 Dec. 1, 2016

Related U.S. Application Data

(63) Continuation of application No. PCT/CN2014/094681, filed on Dec. 23, 2014.

(30) Foreign Application Priority Data

Feb. 12, 2014 (CN) .......................... 2014 1 0049343

(51) Int. Cl.
*H04L 12/28* (2006.01)
*H04L 12/26* (2006.01)
(Continued)

(52) U.S. Cl.
CPC ...... *H04L 43/0894* (2013.01); *H04L 41/0896* (2013.01); *H04L 45/02* (2013.01); *H04L 45/125* (2013.01); *H04L 47/34* (2013.01)

(58) Field of Classification Search
CPC ... H04L 45/124; H04L 45/125; H04L 45/128; H04L 45/24; H04L 45/42
(Continued)

(56) References Cited

U.S. PATENT DOCUMENTS 6,363,319 B1 3/2002 Hsu
6,538,416 B1 * 3/2003 Hahne ..................... H04L 45/26
209/238

(Continued)

FOREIGN PATENT DOCUMENTS

CN 1649315 A 8/2005
CN 101631034 A 1/2010
(Continued)

*Primary Examiner* — Dmitry Levitan

(57) ABSTRACT

A method which includes: obtaining, by a controller, at least two transmission paths between a first edge node and a second edge node; obtaining, by the controller according to bandwidths of the at least two transmission paths, a maximum bandwidth provided by a cluster system, where a bandwidth of each of the transmission paths is equal to a smallest bandwidth in bandwidths of all transmission links in the transmission path, and the maximum bandwidth is less than a sum of bandwidths of at least two transmission links connected to the first edge node; and announcing, by the controller, the maximum bandwidth to a node outside the cluster system by using the first edge node and/or the second edge node. According to the method, accuracy of a maximum bandwidth that is announced by a cluster system to a node outside the cluster system can be improved.

6 Claims, 4 Drawing Sheets

(51) Int. Cl.
*H04L 12/729* (2013.01)
*H04L 12/751* (2013.01)
*H04L 12/24* (2006.01)
*H04L 12/801* (2013.01)

(58) Field of Classification Search
USPC .................. 370/254, 255, 422, 464, 535
See application file for complete search history.

(56) References Cited

U.S. PATENT DOCUMENTS

| | | | |
|---|---|---|---|
| 7,570,638 B2* | 8/2009 | Shimizu | H04L 45/04 370/351 |
| 7,630,317 B2* | 12/2009 | Okamura | H04L 47/10 370/237 |
| 8,599,698 B2* | 12/2013 | Qiu | H04L 43/0882 370/238 |
| 8,711,719 B2* | 4/2014 | Bottari | H04L 41/0896 370/252 |
| 8,787,400 B1* | 7/2014 | Barth | H04L 45/24 370/419 |
| 9,306,831 B2* | 4/2016 | Vasseur | H04L 45/00 |
| 9,503,378 B2* | 11/2016 | Pan | H04L 47/125 |
| 9,755,905 B2* | 9/2017 | Luo | H04L 41/0896 |
| 2005/0105554 A1 | 5/2005 | Kagan et al. | |
| 2005/0169313 A1 | 8/2005 | Okamura et al. | |
| 2012/0102228 A1* | 4/2012 | Cugini | H04L 45/04 709/242 |
| 2013/0208599 A1 | 8/2013 | Mashimo et al. | |
| 2014/0355426 A1 | 12/2014 | Yabusaki et al. | |
| 2016/0173415 A1 | 6/2016 | Wang et al. | |

FOREIGN PATENT DOCUMENTS

| | | |
|---|---|---|
| CN | 101990135 A | 3/2011 |
| CN | 101997770 A | 3/2011 |
| CN | 103780515 A | 5/2014 |
| EP | 2658192 A1 | 10/2013 |

* cited by examiner

US 10,250,477 B2

METHOD AND CONTROLLER FOR ANNOUNCING BANDWIDTH OF CLUSTER SYSTEM

CROSS-REFERENCE TO RELATED APPLICATIONS

This application is a continuation of International Application No. PCT/CN2014/094681, filed on Dec. 23, 2014, which claims priority to Chinese Patent Application No. 201410049343.7, filed on Feb. 12, 2014, both of which are hereby incorporated by reference in their entireties.

TECHNICAL FIELD

The present invention relates to network cluster technologies, and in particular, to a method and a controller for announcing a bandwidth of a cluster system.

BACKGROUND

At present, with the rapid development of communications technologies, users have increasingly high requirements on efficiency of network resource utilization, and subsequently, a cluster system emerges.

There are multiple nodes in a cluster system, where only some of the nodes can be presented to the outside, and the nodes presented to the outside are referred to as edge nodes. If multiple edge nodes all support Multi-Protocol Label Switching (MPLS) traffic engineering (TE), a TE topology among these nodes can be presented by using TE links between the nodes.

When data that is transmitted from a node outside the cluster system needs to be forwarded to a next node through the cluster system, a controller in the cluster system calculates, according to information carried in the data, a transmission path that can provide a service, so that the data can be transmitted to the next node through the cluster system. Therefore, a maximum bandwidth that can be provided by the cluster system needs to be released to another node outside the cluster system, so that a bearer capability of the cluster system when the cluster system bears data is released to the another node outside the cluster system.

In the prior art, the maximum bandwidth that can be provided by the cluster system is obtained by simply adding bandwidths of all transmission links that are in the cluster system and are directly connected to the edge nodes. Refer to FIG. 1, which is a schematic diagram for obtaining a maximum bandwidth of a cluster system in the prior art. As shown in FIG. 1, in the cluster system, bandwidths of transmission links that are directly connected to an edge node A2 add up to 50 G; therefore, the maximum bandwidth that can be provided by the cluster system is 50 G, and a bandwidth that is needed for data transmission between a node A1 and the edge node A2 cannot be greater than 50 G. This method for calculating the maximum bandwidth of the cluster system has low accuracy, and if the maximum bandwidth obtained in this manner is announced to a node outside the cluster system, it may cause that the cluster system cannot transmit data when a bandwidth needed by the data to be transmitted exceeds a bearer capability of the cluster system.

SUMMARY

In view of this, embodiments of the present invention provide a method and a controller for announcing a bandwidth of a cluster system, which can improve accuracy of a maximum bandwidth that is announced by the cluster system to a node outside the cluster system.

According to a first aspect, an embodiment of the present invention provides a method for announcing a bandwidth of a cluster system, where the cluster system includes a controller, a first edge node, and a second edge node, where at least two transmission paths exist between the first edge node and the second edge node, and each of the transmission paths includes at least two transmission links; and the method includes: obtaining, by the controller, at least two transmission paths between the first edge node and the second edge node;

obtaining, by the controller according to bandwidths of the at least two transmission paths, a maximum bandwidth provided by the cluster system, where a bandwidth of each of the transmission paths is equal to a smallest bandwidth in bandwidths of all transmission links in the transmission path, and the maximum bandwidth is less than a sum of bandwidths of at least two transmission links connected to the first edge node; and announcing, by the controller, the maximum bandwidth to a node outside the cluster system by using the first edge node and/or the second edge node.

In a first possible implementation manner of the first aspect, the obtaining, by the controller, at least two transmission paths between the first edge node and the second edge node includes:

obtaining, by the controller, all the transmission paths between the first edge node and the second edge node;

obtaining, by the controller, a cost value of each of the transmission paths and a bandwidth of each of the transmission paths; and sequentially obtaining, by the controller according to the cost values and the bandwidths and according to a first sequence, a transmission path whose bandwidth is not zero, and deducting the bandwidth of the obtained transmission path from a bandwidth of each transmission link in the obtained transmission path, until a transmission link whose current bandwidth is zero exists in each of the other transmission paths in all the transmission paths except the already obtained transmission path.

With reference to the first possible implementation manner of the first aspect, in a second possible implementation manner of the first aspect, the first sequence includes an ascending sequence of the cost values and a descending sequence of the bandwidths, and the sequentially obtaining, by the controller according to the cost values and the bandwidths and according to a first sequence, a transmission path whose bandwidth is not zero includes:

obtaining, by the controller, at least one transmission path whose current cost value is the smallest and whose bandwidth is not zero; and obtaining, by the controller, a transmission path whose bandwidth is not zero and whose bandwidth is the greatest in the at least one transmission path whose current cost value is the smallest and whose bandwidth is not zero.

With reference to the first aspect, the first possible implementation manner of the first aspect, or the second possible implementation manner of the first aspect, in a third possible implementation manner of the first aspect, the obtaining, by the controller according to bandwidths of the at least two transmission paths, a maximum bandwidth provided by the cluster system includes:

obtaining, by the controller according to a sum of the bandwidths of the at least two transmission paths, the maximum bandwidth provided by the cluster system.

According to a second aspect, an embodiment of the present invention provides a controller for announcing a bandwidth of a cluster system, where the cluster system includes a first edge node and a second edge node, where at least two transmission paths exist between the first edge node and the second edge node, and each of the transmission paths includes at least two transmission links; and the controller includes:

a path acquiring unit, configured to obtain at least two transmission paths between the first edge node and the second edge node;

a bandwidth acquiring unit, configured to obtain, according to bandwidths of the at least two transmission paths, a maximum bandwidth provided by the cluster system, where a bandwidth of each of the transmission paths is equal to a smallest bandwidth in bandwidths of all transmission links in the transmission path, and the maximum bandwidth is less than a sum of bandwidths of at least two transmission links connected to the first edge node; and a bandwidth announcing unit, configured to announce the maximum bandwidth to a node outside the cluster system by using the first edge node and/or the second edge node.

In a first possible implementation manner of the second aspect, the path acquiring unit is specifically configured to:

obtain all the transmission paths between the first edge node and the second edge node;

obtain a cost value of each of the transmission paths and a bandwidth of each of the transmission paths; and sequentially obtain, according to the cost values and the bandwidths and according to a first sequence, a transmission path whose bandwidth is not zero, and deduct the bandwidth of the obtained transmission path from a bandwidth of each transmission link in the obtained transmission path, until a transmission link whose current bandwidth is zero exists in each of the other transmission paths in all the transmission paths except the already obtained transmission path.

With reference to the first possible implementation manner of the second aspect, in a second possible implementation manner of the second aspect, the first sequence includes an ascending sequence of the cost values and a descending sequence of the bandwidths, and the sequentially obtaining, by the path acquiring unit according to the cost values and the bandwidths and according to a first sequence, a transmission path whose bandwidth is not zero is specifically:

obtaining at least one transmission path whose current cost value is the smallest and whose bandwidth is not zero; and obtaining a transmission path whose bandwidth is not zero and whose bandwidth is the greatest in the at least one transmission path whose current cost value is the smallest and whose bandwidth is not zero.

With reference to the second aspect, the first possible implementation manner of the second aspect, or the second possible implementation manner of the second aspect, in a third possible implementation manner of the second aspect, the bandwidth acquiring unit is specifically configured to obtain, according to a sum of the bandwidths of the at least two transmission paths, the maximum bandwidth provided by the cluster system.

It can be seen from the foregoing technical solutions that, the embodiments of the present invention have the following beneficial effects:

A maximum bandwidth provided by the cluster system is less than a sum of bandwidths of at least two transmission links that are connected to an edge node, and is not equal to the simple sum of the bandwidths of the transmission links that are directly connected to the edge node; therefore, the maximum bandwidth, which is announced to the outside, of the cluster system is relatively accurate, so that a problem that a bandwidth needed by to-be-transmitted data exceeds a bearer capability of a cluster system because a maximum bandwidth, which is announced to the outside, of the cluster system is of low accuracy can be reduced.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the technical solutions in the present invention more comprehensible, the following describes the embodiments of the present invention in detail with reference to the accompanying drawings.

It should be clear that the described embodiments are merely some but not all of the embodiments of the present invention. All other embodiments obtained by a person of ordinary skill in the art based on the embodiments of the present invention without creative efforts shall fall within the protection scope of the present invention.

Figure 1:
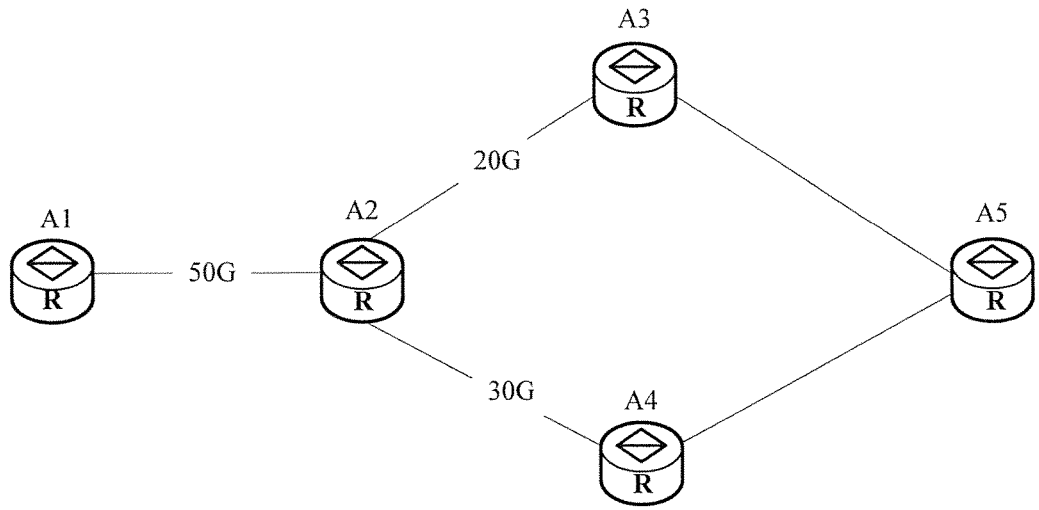
FIG. 1 is a schematic diagram for obtaining a maximum bandwidth of a cluster system in the prior art.
Figure 2:
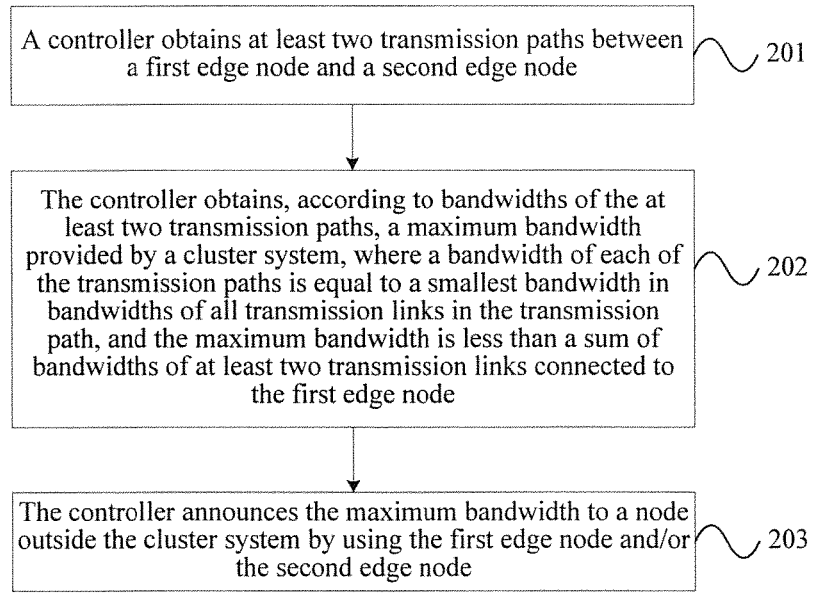
FIG. 2 is a schematic flowchart of a method for announcing a bandwidth of a cluster system according to an embodiment of the present invention.

An embodiment of the present invention provides a method for announcing a bandwidth of a cluster system. Refer to FIG. 2, which is a schematic flowchart of the method for announcing a bandwidth of a cluster system according to this embodiment of the present invention. As shown in the figure, the method includes the following steps:

Step S201: A controller obtains at least two transmission paths between a first edge node and a second edge node.

Specifically, the cluster system in this embodiment of the present invention includes the controller, the first edge node, and the second edge node, where at least two transmission paths exist between the first edge node and the second edge node, and each of the transmission paths includes at least two transmission links.

For example, the step of obtaining, by a controller, at least two transmission paths between a first edge node and a second edge node may be:

first, the controller obtains all the transmission paths between the first edge node and the second edge node;

then, the controller obtains a cost (Cost) value of each of the transmission paths between the first edge node and the second edge node and a bandwidth of each of the transmission paths; and finally, the controller sequentially obtains, according to the cost values and the bandwidths and according to a first sequence, a transmission path whose bandwidth is not zero, and deducts the bandwidth of the obtained transmission path from a bandwidth of each transmission link in the obtained transmission path, until a transmission link whose current bandwidth is zero exists in each of the other transmission paths in all the transmission paths except the already obtained transmission path.

For example, the first sequence may include an ascending sequence of the cost values and a descending sequence of the bandwidths. In this case, a method for sequentially obtaining, by the controller according to the cost values and the bandwidths and according to the first sequence, a transmission path whose bandwidth is not zero is: searching, by the controller, for at least one transmission path that is between the first edge node and the second edge node and whose current cost value is the smallest and whose bandwidth is not zero, and then obtaining, by the controller, a transmission path whose bandwidth is not zero and whose bandwidth is the greatest in the at least one transmission path whose current cost value is the smallest and whose bandwidth is not zero, until a transmission link whose current bandwidth is zero exists in each of the other transmission paths in all the transmission paths except the already obtained transmission path. That is, if transmission paths whose cost values are the smallest include at least two transmission paths whose bandwidths are not zero, a transmission path whose bandwidth is not zero and whose bandwidth is the greatest in the at least two transmission paths whose cost values are the smallest and whose bandwidths are not zero is obtained; if at least two transmission paths whose bandwidths are not zero and whose bandwidths are the greatest exist, any one of the transmission paths may be obtained, and a remaining transmission path may be subsequently obtained. When all transmission paths in all the transmission paths except the already obtained transmission path includes a transmission link whose bandwidth is zero, the controller stops the procedure of searching for a transmission path. Each time after obtaining a transmission path, the controller deducts a bandwidth of the transmission path from a bandwidth of each transmission link in each obtained transmission path. In this case, next time a transmission path whose current cost value is the smallest between the first edge node and the second edge node is searched for, a same transmission link is not obtained repeatedly, which can avoid that a bandwidth of a same transmission link is calculated multiple times.

The cost value refers to a cost value based on the Interior Gateway Protocol (Interior Gateway Protocol, IGP).

Step S202: The controller obtains, according to bandwidths of the at least two transmission paths, a maximum bandwidth provided by the cluster system, where a bandwidth of each of the transmission paths is equal to a smallest bandwidth in bandwidths of all transmission links in the transmission path, and the maximum bandwidth is less than a sum of bandwidths of at least two transmission links connected to the first edge node.

For example, the controller obtains a maximum bandwidth between the first edge node and the second edge node, that is, the maximum bandwidth that can be provided by the cluster system, according to a sum of the bandwidths of the at least two obtained transmission paths.

In this embodiment of the present invention, a bandwidth of each of the transmission paths is equal to a smallest bandwidth in bandwidths of all transmission links in the transmission path, for example, a transmission path includes a first transmission link and a second transmission link, where a bandwidth of the first transmission link the is 10 G, and a bandwidth of the second transmission link is 20 G, and therefore, a bandwidth of the transmission path is equal to a smallest bandwidth in the bandwidths of the two transmission links, that is, the bandwidth of the transmission path is equal to 10 G.

The maximum bandwidth that can be provided by the cluster system is less than a sum of bandwidths of at least two transmission links connected to the first edge node, and a reason thereof may include: based on the description of step 201, if a transmission link belongs to two transmission paths, after one of the transmission paths is obtained, a part or all of a bandwidth of the transmission link needs to be deducted; in this case, when the other transmission path is obtained, this deducted part of the bandwidth is no longer used, because this part of the bandwidth is already occupied by a transmission path; if the entire bandwidth of the transmission link is deducted, the transmission path that includes the transmission link cannot be obtained by the controller, and therefore cannot be used to calculate the maximum bandwidth of the cluster system. Therefore, in this embodiment of the present invention, the maximum bandwidth of the cluster system is not obtained by simply adding bandwidths of all transmission links in the cluster system, and therefore, the maximum bandwidth of the cluster system is less than the sum of the bandwidths of the at least two transmission links that are connected to the first edge node, to avoid that a bandwidth needed by data entering the cluster system exceeds a bearer capability of the cluster system.

Step S203: The controller announces the maximum bandwidth to a node outside the cluster system by using the first edge node and/or the second edge node.

Specifically, the maximum bandwidth that can be provided by the cluster system is announced to the node outside the cluster system by using the first edge node and/or the second edge node; in this case, the node outside the cluster system knows that there is a path in the cluster system, where edge nodes of the path are the first edge node and the second edge node, and learns about the maximum bandwidth of the cluster system, where the maximum bandwidth that can be provided by the cluster system is a bandwidth of the path; in this way, the path between the first edge node and the second edge node and the bandwidth of the path are announced to the node outside the cluster system. If the maximum bandwidth that can be provided by the cluster system is announced to the node outside the cluster system by using the first edge node and/or the second edge node, an identifier of the first edge node and an identifier of the second edge node also need to be simultaneously announced to the node outside the cluster system, so as to indicate, to the node outside the cluster system, two edge nodes a maximum bandwidth between which is the maximum bandwidth.

In addition, the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

Embodiment

Figure 3:
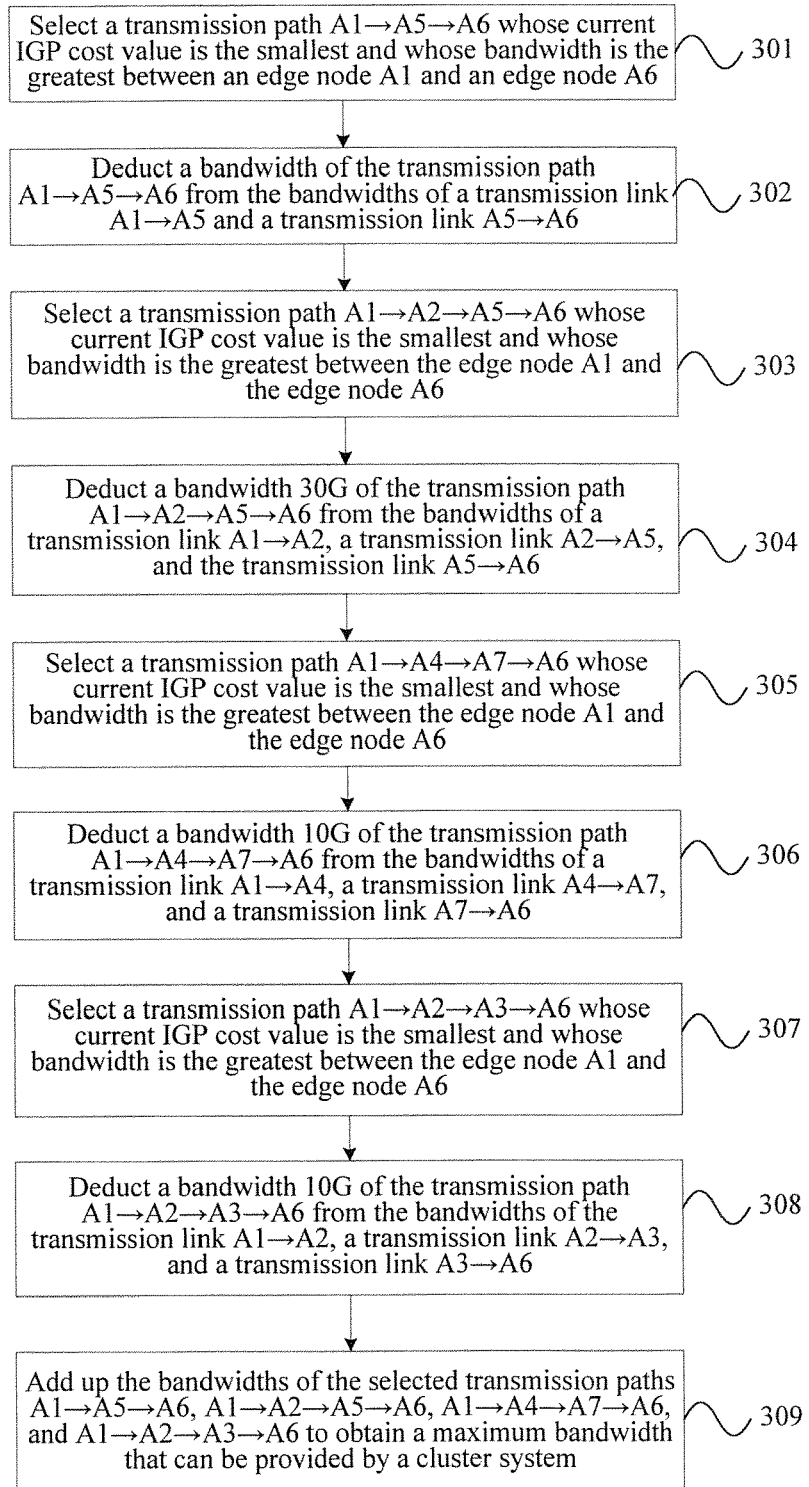
FIG. 3 is a schematic flowchart of an embodiment of the method for announcing a bandwidth of a cluster system according to the embodiment of the present invention.
Figure 4:
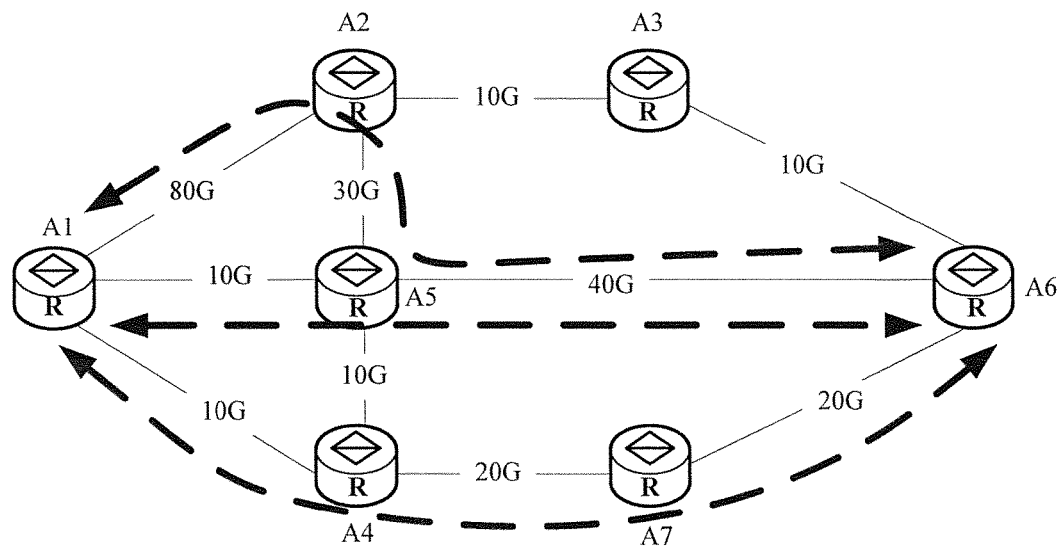
FIG. 4 is a schematic topology diagram of the embodiment of the method for announcing a bandwidth of a cluster system according to the embodiment of the present invention.

Refer to FIG. 3 and FIG. 4, which are respectively a schematic flowchart and a schematic topology diagram of an embodiment of the method for announcing a bandwidth of a cluster system according to the embodiment of the present invention. In this embodiment, a cost value of a transmission link between every two nodes is equal to 10, and in the cluster system, two endpoints of a transmission path A1→A6 exist between an edge node A1 (which is equivalent to the foregoing first edge node) and an edge node A6 (which is equivalent to the foregoing second edge node), where the transmission path A1→A6 carries a maximum bandwidth that can be provided between the two edge nodes in the cluster system, and the maximum bandwidth is released to the outside of the cluster system, so that the transmission path can support data transmission. As shown in the figure, the method includes the following steps:

Step 301: As shown in FIG. 4, select a transmission path whose current IGP cost value is the smallest and whose bandwidth is the greatest between the edge node A1 and the edge node A6. In this embodiment, "whose current IGP cost value is the smallest and whose bandwidth is the greatest" refers to that when a transmission path is selected, a transmission path whose cost value is the smallest is preferentially considered, and then a transmission path whose bandwidth is the greatest is considered; and if there are multiple transmission paths whose cost values are the smallest, a transmission path whose bandwidth is the greatest is selected. Therefore, A1→A5→A6 is selected, where a cost value of the transmission path is equal to a sum of a cost value 10 of a transmission link A1→A5 and a cost value 10 of a transmission link A5→A6, so that the cost value of the transmission path A1→A5→A6 is equal to 20, and a bandwidth of the TE link is 10 G. A bandwidth of a transmission path refers to a bandwidth whose value is the smallest in bandwidths that are supported by transmission links in the transmission path, for example, a bandwidth of the transmission link A1→A5 is 10 G, a bandwidth of the transmission link A5→A6 is 40 G, and therefore, the bandwidth of the transmission path A1→A5→A6 is 10 G.

Step 302: Deduct the bandwidth of the transmission path A1→A5→A6 from the bandwidths of the transmission link A1→A5 and the transmission link A5→A6; therefore, a remaining bandwidth of the transmission link A1→A5 is zero, and a remaining bandwidth of the transmission link A5-A6 is 30 G.

Step 303: As shown in FIG. 4, repeat step 301, that is, select a transmission path whose current cost value is the smallest and whose bandwidth is the greatest between the edge node A1 and the edge node A6. In the transmission path A1→A5→A6, the bandwidth of the transmission link A1→A5 is zero, and therefore, when selection of a transmission path is performed again, no transmission path that includes the transmission link A1→A5 is selected, to avoid that the bandwidth of the transmission link A1→A5 is used repeatedly. Therefore, a transmission path whose current IGP cost value is the smallest and whose bandwidth is the greatest between the edge node A1 and the edge node A6, that is, A1→A2→A5→A6, is selected, where an IGP cost value of the transmission path is equal to a sum of a cost value 10 of a transmission link A1→A2, a cost value 10 of a transmission link A2→A5, and the cost value 10 of the transmission link A5→A6, so that the cost value of the transmission path A1→A2→A5→A6 is equal to 30; and a bandwidth of the transmission path is 30 G. Because a bandwidth of the transmission link A1→A2 is 80 G, a bandwidth of the transmission link A2-A5 is 30 G, and the bandwidth of the transmission link A5→A6 is 30 G, the bandwidth of the transmission path A1→A2→A5→A6 is 30 G. Herein, cost values of a transmission path A1→A2→A3→A6, a transmission path A1→A4→A7→A6, and a transmission path A1→A4→A5→A6 are all equal to 30, but bandwidths of these transmission paths are all 10 G, and are less than the bandwidth 30 G of the transmission path A1→A2→A5→A6. In this embodiment of the present invention, the maximum bandwidth of the cluster system needs to be obtained; therefore, a transmission path whose bandwidth is relatively large is preferentially selected, and therefore, these transmission paths whose cost values are 30 and whose bandwidths are relatively small are not selected in this step.

Step 304: Deduct the bandwidth 30 G of the transmission path A1→A2→A5→A6 from the bandwidths of the transmission link A1→A2, the transmission link A2→A5, and the transmission link A5→A6; therefore, a remaining bandwidth of the transmission link A1→A2 is 50 G, a remaining bandwidth of the transmission link A2→A5 is zero, and the remaining bandwidth of the transmission link A5→A6 is zero.

Step 305: As shown in FIG. 4, repeat step 301, that is, select transmission paths whose current IGP cost values are the smallest and whose bandwidths are the greatest between the edge node A1 and the edge node A6, that is, A1→A4→A7→A6 and A1→A2→A3→A6. Herein, one transmission path may be randomly selected from A1→A4→A7→A6 and A1→A2→A3→A6, and this embodiment is described by using an example in which the transmission path A1→A4→A7→A6 is selected. A cost value of the transmission path A1→A4→A7→A6 is equal to a sum of a cost value 10 of a transmission link A1→A2, a cost value 10 of a transmission link A4→A7, and a cost value 10 of a transmission link A7→A6, so that the cost value of the transmission path A1→A4→A7→A is equal to 30; and a bandwidth of the transmission path A1→A4→A7→A6 is 10 G. A cost value of the transmission path A1→A2→A3→A6 is equal to a sum of the cost value 10 of the transmission link A1→A2, a cost value 10 of a transmission link A2→A3, and a cost value 10 of a transmission link A3→A6, so that the cost value of the transmission path A1→A2→A3→A6 is equal to 30; and a bandwidth of the transmission path A1→A2→A3→A6 is 10 G.

Step 306: Deduct the bandwidth 10 G of the transmission path A1→A4→A7→A6 from the bandwidths of the transmission link A1→A4, the transmission link A4→A7, and the transmission link A7→A6; therefore, a remaining bandwidth of the transmission link A1→A4 is zero, a remaining bandwidth of the transmission link A4→A7 is 10 G, and a remaining bandwidth of the transmission link A7→A6 is 10 G.

Step 307: As shown in FIG. 4, repeat step 301, that is, select a transmission path whose current IGP cost value is the smallest and whose bandwidth is the greatest between the edge node A1 and the edge node A6, that is, A1→A2→A3→A6.

Step 308: Deduct a bandwidth 10 G of the transmission path A1→A2→A3→A6 from the bandwidths of the transmission link A1→A2, the transmission link A2→A3, and the transmission link A3→A6; therefore, a remaining bandwidth of the transmission link A1→A2 is 40 G, a remaining bandwidth of the transmission link A2→A3 is zero, and a remaining bandwidth of the transmission link A3→A6 is zero.

Step 309: As shown in FIG. 4, because all remaining transmission paths include a transmission link whose bandwidth is zero, no transmission path between the edge node A1 and the edge node A6 can be selected. Therefore, the selection process ends, and the bandwidths of the foregoing three selected transmission paths, that is, A1→A5→A6, A1→A2→A5→A6, A1→A4→A7→A6, and A1→A2→A3→A6, are added up to obtain the maximum bandwidth that can be provided by the cluster system, that is, 10 G+30 G+10 G+10 G=60 G. If the prior art is used, a bandwidth 80 G+10 G+10 G=100 G is obtained after bandwidths of three transmission links that are connected to the edge node A1 are simply added; therefore, the maximum bandwidth 60 G that is provided by the cluster system and is obtained in the technical solutions of the present invention is less than the maximum bandwidth 100 G that is provided by the cluster system and is obtained in the prior art.

Embodiments of the present invention further provide apparatus embodiments for implementing the steps and the method in the foregoing method embodiment.

Figure 5:
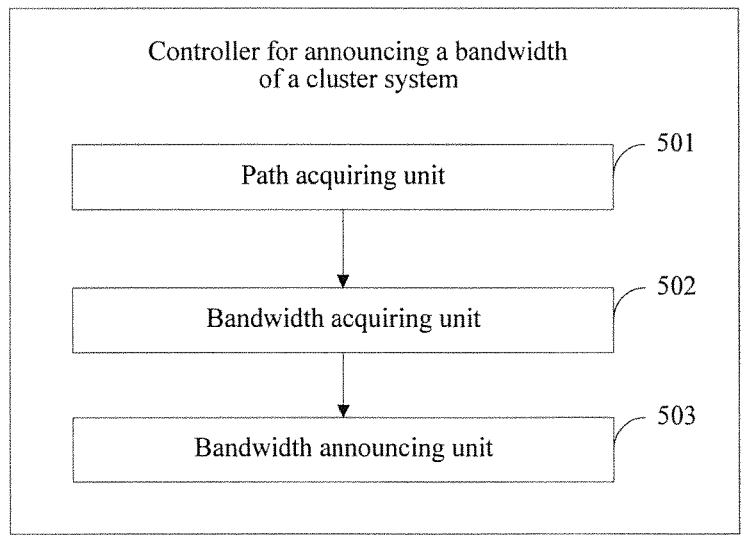
FIG. 5 is a schematic functional diagram of a controller for announcing a bandwidth of a cluster system according to an embodiment of the present invention.

Refer to FIG. 5, which is a functional block diagram of a controller for announcing a bandwidth of a cluster system according to an embodiment of the present invention, where the cluster system includes a first edge node and a second edge node, where at least two transmission paths exist between the first edge node and the second edge node, and each of the transmission paths includes at least two transmission links. As shown in the figure, the controller includes:

a path acquiring unit 501, configured to obtain at least two transmission paths between the first edge node and the second edge node;

a bandwidth acquiring unit 502, configured to obtain, according to bandwidths of the at least two transmission paths, a maximum bandwidth provided by the cluster system, where a bandwidth of each of the transmission paths is equal to a smallest bandwidth in bandwidths of all transmission links in the transmission path, and the maximum bandwidth is less than a sum of bandwidths of at least two transmission links connected to the first edge node; and a bandwidth announcing unit 503, configured to announce the maximum bandwidth to a node outside the cluster system by using the first edge node and/or the second edge node.

The path acquiring unit 501 is specifically configured to:

obtain all the transmission paths between the first edge node and the second edge node;

obtain a cost value of each of the transmission paths and a bandwidth of each of the transmission paths; and sequentially obtain, according to the cost values and the bandwidths and according to a first sequence, a transmission path whose bandwidth is not zero, and deduct the bandwidth of the obtained transmission path from a bandwidth of each transmission link in the obtained transmission path, until a transmission link whose current bandwidth is zero exists in each of the other transmission paths in all the transmission paths except the already obtained transmission path.

The first sequence includes an ascending sequence of the cost values and a descending sequence of the bandwidths, and the sequentially obtaining, by the path acquiring unit 501 according to the cost values and the bandwidths and according to a first sequence, a transmission path whose bandwidth is not zero is specifically:

obtaining at least one transmission path whose current cost value is the smallest and whose bandwidth is not zero; and obtaining a transmission path whose bandwidth is not zero and whose bandwidth is the greatest in the at least one transmission path whose current cost value is the smallest and whose bandwidth is not zero.

The bandwidth acquiring unit 502 is specifically configured to obtain, according to a sum of the bandwidths of the at least two transmission paths, the maximum bandwidth provided by the cluster system.

Figure 6:
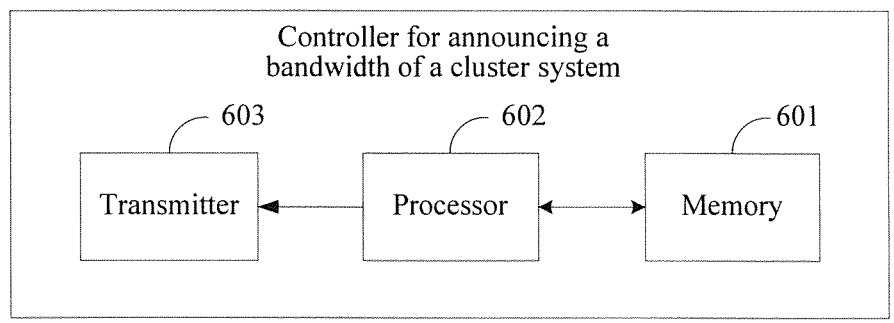
FIG. 6 is a schematic structural diagram of a controller for announcing a bandwidth of a cluster system according to an embodiment of the present invention.

Refer to FIG. 6, which is a schematic structural diagram of a controller for announcing a bandwidth of a cluster system according to an embodiment of the present invention. As shown in the figure, the device includes:

a memory 601, configured to store one or more sets of program code;

a processor 602, separately coupled to the memory 601 and a transmitter 603, and configured to invoke the program code stored in the memory 601, to perform the method shown in FIG. 2, which specifically includes: obtaining at least two transmission paths between a first edge node and a second edge node; and obtaining, according to bandwidths of the at least two transmission paths, a maximum bandwidth provided by the cluster system, where a bandwidth of each of the transmission paths is equal to a smallest bandwidth in bandwidths of all transmission links in the transmission path, and the maximum bandwidth is less than a sum of bandwidths of at least two transmission links connected to the first edge node; and the transmitter 603, configured to announce the maximum bandwidth to a node outside the cluster system by using the first edge node and/or the second edge node.

The obtaining, by the processor 602, at least two transmission paths between a first edge node and a second edge node is specifically:

obtaining all the transmission paths between the first edge node and the second edge node;

obtaining a cost value of each of the transmission paths and a bandwidth of each of the transmission paths; and sequentially obtaining, according to the cost values and the bandwidths and according to a first sequence, a transmission path whose bandwidth is not zero, and deducting the bandwidth of the obtained transmission path from a bandwidth of each transmission link in the obtained transmission path, until a transmission link whose current bandwidth is zero exists in each of the other transmission paths in all the transmission paths except the already obtained transmission path.

The first sequence includes an ascending sequence of the cost values and a descending sequence of the bandwidths, and the sequentially obtaining, by the processor 602 according to the cost values and the bandwidths and according to a first sequence, a transmission path whose bandwidth is not zero is specifically:

obtaining at least one transmission path whose current cost value is the smallest and whose bandwidth is not zero; and obtaining a transmission path whose bandwidth is not zero and whose bandwidth is the greatest in the at least one transmission path whose current cost value is the smallest and whose bandwidth is not zero.

The obtaining, by the processor 602 according to bandwidths of the at least two transmission paths, a maximum bandwidth provided by the cluster system is specifically:

obtaining, according to a sum of the bandwidths of the at least two transmission paths, the maximum bandwidth provided by the cluster system.

Because the processor and the transmitter in this embodiment can perform the method shown in FIG. 2, for a part that is not described in this embodiment in detail, reference may be made to related description of FIG. 2.

The technical solutions of the present invention have the following beneficial effects:

A maximum bandwidth of a cluster system can be automatically calculated, the calculated maximum bandwidth provided by the cluster system is less than a sum of bandwidths of at least two transmission links that are connected to an edge node, and is not equal to the simple sum of the bandwidths of all the transmission links; therefore, the maximum bandwidth, which is announced to the outside, of the cluster system is relatively accurate, so that a problem that a bandwidth needed by to-be-transmitted data exceeds a bearer capability of the cluster system because a maximum bandwidth, which is announced to the outside, of the cluster system is of low accuracy can be reduced.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method for announcing a bandwidth of a cluster system, wherein the cluster system comprises a controller, a first edge node, a second edge node, and at least two other nodes, wherein at least two transmission paths exist between the first edge node and the second edge node, and each of the transmission paths comprises at least two transmission links, the method comprising:
   determining, by the controller, at least two transmission paths between the first edge node and the second edge node, by:
      determining, by the controller, all transmission paths between the first edge node and the second edge node;
      determining, by the controller, a cost value of each of the transmission paths and a bandwidth of each of the transmission paths; and
      determining, by the controller according to the cost values and the bandwidths, a transmission path whose bandwidth is not zero, and deducting the bandwidth of the determined transmission path from a bandwidth of each transmission link in the determined transmission path, continuing to perform the action of determining the transmission path whose bandwidth is not zero until a transmission link whose current bandwidth is zero exists in each of the other transmission paths in all the transmission paths except the already determined transmission path;
   determining, by the controller according to bandwidths of the at least two transmission paths, a bandwidth provided by the cluster system, wherein the bandwidth provided by the cluster system is less than a sum of bandwidths of at least two transmission links connected to the first edge node, the at least two other nodes are connected to the first edge node via the at least two transmission links, and the at least other two nodes and the at least two transmission links are in a one-to-one correspondence; and
   announcing, by the controller, the bandwidth provided by the cluster system to a node outside the cluster system.

2. The method according to claim 1, wherein the transmission path whose bandwidth is not zero is determined by a first sequence comprising an ascending sequence of the cost values and a descending sequence of the bandwidths, and determining, by the controller according to the cost values and the bandwidths, the transmission path whose bandwidth is not zero comprises:
   determining, by the controller, at least one transmission path whose current cost value is the smallest and whose bandwidth is not zero; and
   determining, by the controller, a transmission path whose bandwidth is not zero and whose bandwidth is the greatest in the at least one transmission path whose current cost value is the smallest and whose bandwidth is not zero.

3. The method according to claim 1, wherein determining, by the controller according to bandwidths of the at least two transmission paths, the bandwidth provided by the cluster system comprises:
   determining, by the controller according to a sum of the bandwidths of the at least two transmission paths, the bandwidth provided by the cluster system.

4. A controller for announcing a bandwidth of a cluster system, wherein the cluster system comprises a first edge node, a second edge node, and at least two other nodes, wherein at least two transmission paths exist between the first edge node and the second edge node, and each of the transmission paths comprises at least two transmission links, the controller comprising:
   a memory; and
   a processor in communication with the memory, wherein the processor is configured to:
      determine all the transmission paths between the first edge node and the second edge node;
      determine a cost value of each of the transmission paths and a bandwidth of each of the transmission paths;
      determine, according to the cost values and the bandwidths, a transmission path whose bandwidth is not zero, and deduct the bandwidth of the determined transmission path from a bandwidth of each transmission link in the determined transmission path, continuing to determine the transmission path whose bandwidth is not zero until a transmission link whose current bandwidth is zero exists in each of the other transmission paths in all the transmission paths except the already determined transmission path;
      determine, according to bandwidths of at least two of the transmission paths, a bandwidth provided by the cluster system, wherein the bandwidth is less than a sum of bandwidths of at least two transmission links connected to the first edge node, the at least two other nodes are connected to the first edge node via the at least two transmission links, and the at least other two nodes and the at least two transmission links are in a one-to-one correspondence, and
      announce the bandwidth provided by the cluster system to a node outside the cluster system.

5. The controller according to claim 4, wherein the transmission path whose bandwidth is not zero is determined by a first sequence comprising an ascending sequence of the cost values and a descending sequence of the bandwidths, and to determining, according to the cost values and the bandwidths and according to a first sequence, the transmission path whose bandwidth is not zero comprises:
   determining at least one transmission path whose current cost value is the smallest and whose bandwidth is not zero; and determining a transmission path whose bandwidth is not zero and whose bandwidth is the greatest in the at least one transmission path whose current cost value is the smallest and whose bandwidth is not zero.

6. The controller according to claim 4, wherein the processor is further configured to determine, according to a sum of the bandwidths of the at least two transmission paths, the bandwidth provided by the cluster system.

* * * * *